(12) United States Patent

Sheaffer

(10) Patent No.: US 7,900,828 B2
(45) Date of Patent: *Mar. 8, 2011

(54) METHODS AND SYSTEM FOR PROVIDING MULTIPLE CREDIT LINES

(75) Inventor: Dean Sheaffer, Birdsboro, PA (US)

(73) Assignee: Boscov's Department Store, LLC, Reading, PA (US)

( * ) Notice: Subject to any disclaimer, the term of this patent is extended or adjusted under 35 U.S.C. 154(b) by 84 days.

This patent is subject to a terminal disclaimer.

(21) Appl. No.: 12/258,047

(22) Filed: Oct. 24, 2008

(65) Prior Publication Data

US 2009/0144147 A1 Jun. 4, 2009

Related U.S. Application Data

(63) Continuation of application No. 10/986,165, filed on Nov. 12, 2004, now Pat. No. 7,455,221.

(51) Int. Cl.
*G06K 5/00* (2006.01)
(52) U.S. Cl. .......................... 235/380; 235/492
(58) Field of Classification Search .................. 235/380, 235/382, 383, 487, 492
See application file for complete search history.

(56) References Cited

U.S. PATENT DOCUMENTS

| | | | | |
|---|---|---|---|---|
| 6,032,136 | A * | 2/2000 | Brake et al. | 705/41 |
| 6,385,594 | B1 * | 5/2002 | Lebda et al. | 705/38 |
| 6,629,081 | B1 * | 9/2003 | Cornelius et al. | 705/30 |
| 7,455,221 | B2 * | 11/2008 | Sheaffer | 235/380 |
| 2002/0156723 | A1 | 10/2002 | Lilly et al. | |
| 2003/0055778 | A1 | 3/2003 | Erlanger | |
| 2003/0115126 | A1 * | 6/2003 | Pitroda | 705/36 |
| 2003/0163414 | A1 * | 8/2003 | O'Brien et al. | 705/38 |
| 2005/0077350 | A1 | 4/2005 | Courtion et al. | |

* cited by examiner

*Primary Examiner* — Daniel St. Cyr
(74) *Attorney, Agent, or Firm* — Dennis Donahue & Associates; Dennis J M Donahue, III

(57) ABSTRACT

A method and system for applying for and providing an access device, whereby an applicant completes a multipurpose access device application that is reviewed under qualification processes established by multiple access device providers acting in cooperation with each other. Upon a positive result from the review, a linked account is established for the multiple access device providers, and a common access device is issued for the linked account with a single or multiple account numbers. The access device user can take advantage of joint incentive and rewards programs for the linked account that join the incentive and rewards programs of the multiple access device providers, and that accumulate rewards separately for each provider.

18 Claims, 15 Drawing Sheets

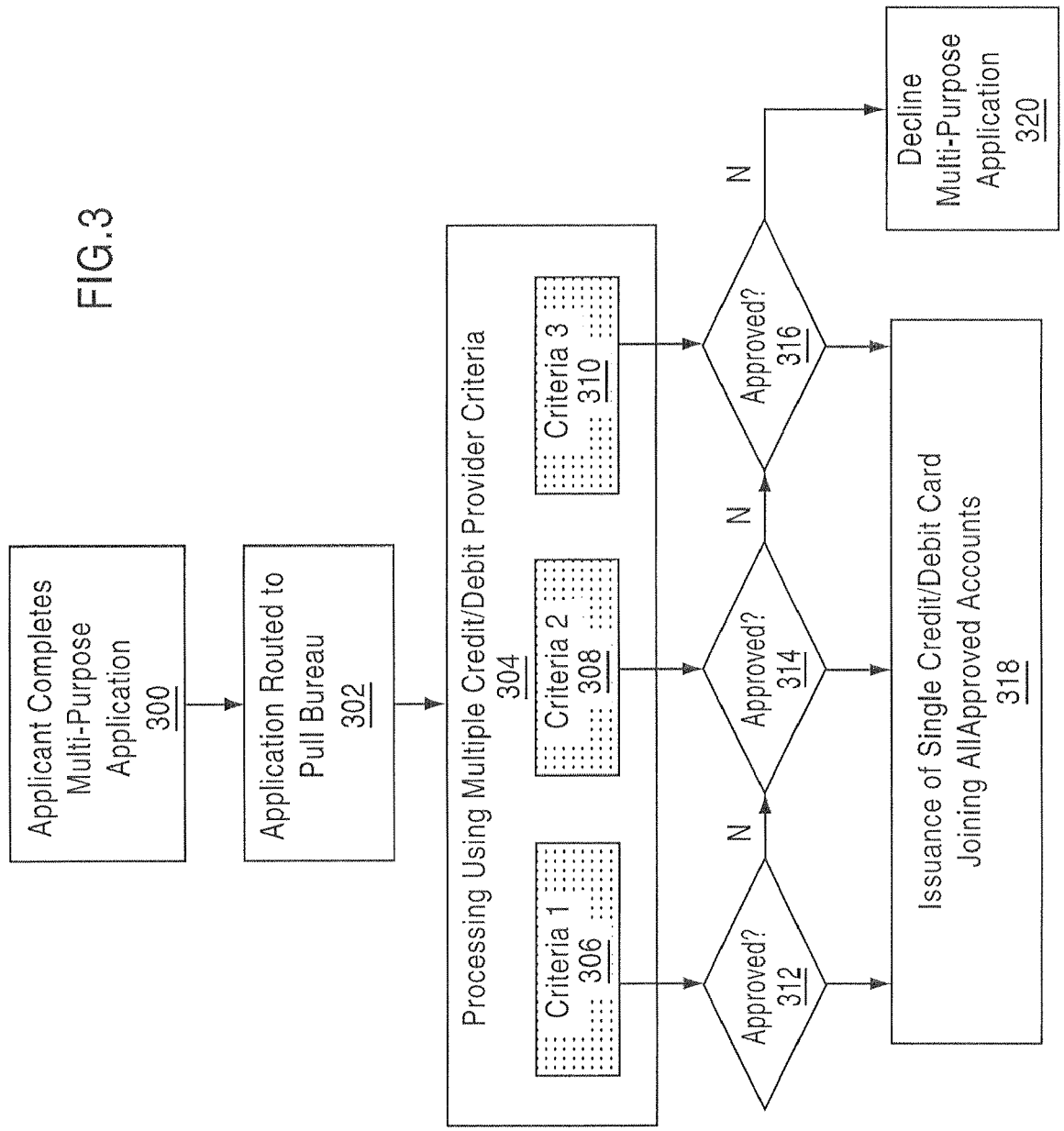

FIG. 5A

BOSCOV'S RETAIL CREDIT AGREEMENT
For the Boscov's Retail Credit Account

YOUR BILLING RIGHTS.
KEEP THIS NOTICE FOR FUTURE REFERENCE.
This notice contains important information about your rights and our responsibilities under the Fair Credit Billing Act.

Notify us in case of errors or questions about your bill.
If you think your bill is wrong, or if you need more information about a transaction on your bill, write to us on a separate sheet at the address listed on your bill. Write to us as soon as possible. We must hear from you no later than 60 days after we've sent you the first bill on which the error or problem appeared. You can telephone us, but doing so will not preserve your rights.

In your letter, give us the following information:
- Your name and account number.
- The dollar amount of the suspected error.
- Describe the error and explain, if you can, why you believe there is an error. If you need more information, describe the item as it appears on your statement.

Your Rights and Our Responsibilities After We Receive Your Written Notice

We must acknowledge your letter within 30 days, unless we have corrected the error by then. Within 90 days, we must either correct the error or explain why we believe the bill was correct.

After we receive your letter, we cannot try to collect any amount you question, or report you as delinquent. We can continue to bill you for the amount you question, including FINANCE CHARGES, and we can apply any unpaid amount against your credit guideline. You do not have to pay any questioned amount while we are investigating, but you are still obligated to pay the parts of your bill that are not in question.

you may have the right not to pay the remaining amount due on the property or services.

BOSCOV'S PRIVACY POLICY -

The following Privacy Policy is applicable to consumer customers of BOSCOV'S Inc. and its subsidiaries and affiliates that may provide consumer financial services, including BOSCOV'S Department Stores, LLC (including Boscovs.com), BOSCOV'S Receivables Finance Corp., BOSCOV'S Credit Card Master Trust and BOSCOV'S Travelcenter, Inc. ("BOSCOV'S").

At BOSCOV'S, we respect our customers and understand that you are concerned about privacy, so we've instituted policies intended to ensure that your personal information is handled safely and responsibly. We encourage you to refer to this policy on an ongoing basis so that you understand our Privacy Policy. This policy was last updated on August 3, 2002. If you have any questions about this policy you can contact us by mail at Customer Service, ATTN: Privacy Manager, P.O. Box 4202, Reading, Pennsylvania 19606, by calling our Privacy Hotline at 1-800-755-2884 or click on "E-mail Us" at Boscovs.com.

WHAT INFORMATION DO WE COLLECT?

BOSCOV'S may collect personally identifiable information about you, depending on the services you use.
- We keep information we receive from you on applications or other forms, including services involving BOSCOV'S Travelcenter and Boscoverage, our extended service plan.
- We keep information we receive from you when you use certain specialized services including layaway, gift registry, appliance service, check writing programs such as Western Union Quick Collect and various bank-by-phone programs.

we collect on the internet; how BOSCOV'S uses this information; and how to Opt Out of their use can be found by clicking the "Privacy" button on our home page at HTTP://WWW.BOSCOVS.COM. The additional Privacy Policy information, which is specific to the use of our website, is incorporated herein by reference.

HOW DO WE USE YOUR INFORMATION?

We use your information in a number of ways, including the following:
- For marketing and promotional purposes. For example, we may send direct mail, statement stuffers or e-mails to you about products or events that we think may be of interest to you. We also may send you offers for discounts or free services (e.g., free gift wrap or shipping) on our web site.
- Your information may also be needed to complete transactions you request or to provide services you have requested. For example, we may need to use your information to keep track of your layaway, to determine if you have a Boscoverage contract or to keep track of your travel preferences.

BOSCOV'S reserves the right to use personally identifiable information about customers and potential customers in any lawful manner.

DO WE SHARE YOUR INFORMATION?

The information gathered, for example, your name and address, may be shared with corporate affiliates within BOSCOV'S. We may also share the information with unaffiliated third parties, including responsible companies with which we have a relationship. For example:

We may disclose the following kinds of personally identifiable information about you:
- Information we receive from you on your credit application or other forms, such as your name, address, social security number and date of birth;
- Information about your transactions with us, our affiliates, or others, such

FIG.5B

If we find we made a mistake on your bill, you will not have to pay any FINANCE CHARGES related to any questioned amount. If we didn't make a mistake, you may have to pay FINANCE CHARGES, and you will have to make up any missed payments on the questioned amount. In either case we will send you a statement of the amount you owe and the date that is due.

If you fail to pay the amount that we think you owe, we may report you as delinquent. However, if our explanation does not satisfy you and you write to us within ten days telling us that you still refuse to pay, we must tell anyone we report you to that you have a question about your bill. And we must tell you the name of anyone we reported you to. We must tell anyone we report you to that the matter has been settled between us when it finally is.

If we don't follow these rules, we can not collect the first $50 of the questioned amount, even if your bill was correct.

Special Rule for Credit Card Purchases

If you have a problem with the quality of property or services that you purchased with a credit card, and you have tried in good faith to correct the problem with us,

- We keep information about your transactions with us.
- We keep information we receive from consumer reporting agencies and your BOSCOV'S VISA® or other Credit Card applications.

We also may receive some information about you from other sources and may add it to your account information. For example, we might get your updated address from a shipper or information on your preferences from another unaffiliated company conducting a promotion or event with us.

We may acquire customer lists from other parties so that we may invite them to become a new customer of BOSCOV'S or visit us at Boscovs.com. Each time we send an offer, we provide customers with the opportunity to opt out of receiving future offers.

BOSCOV'S reserves the right to collect or otherwise obtain personally identifiable information about customers and potential customers in any lawful manner.

WHAT ADDITIONAL INFORMATION DO WE COLLECT AT BOSCOVS.COM, OUR INTERNET SITE?

Additional information about cookies and additional various types of information as your account balance, credit limit, account number, payment history, parties to transactions, types of goods and/or services purchased and credit card usage;

- Information we receive from a consumer-reporting agency, such as your creditworthiness and credit history.

We may disclose personally identifiable information about you to the following types of unaffiliated third parties as permitted by law:

- Other financial service providers. For example, Boscov's is party to a "co-branded" Boscov's/VISA® dual-purpose credit card arrangement with one or more financial service providers.
- Non-financial companies, such as other retailers, publishers, direct marketers and companies that provide travel services through Boscov's Travelcenter;
- Web sites with which BOSCOV'S has a joint marketing arrangement. For example, The Flower Club.
- Companies, which we may utilize to provide extended services under our

FIG. 5C

Boscoverage program or other in-home services.
- Non-profit and community service organization that operate in communities we serve.
- Some of our vendors may work closely with us to ship your order directly to you for certain specialty items such as furniture, shoes and dinnerware. In certain instances, we may share certain information about you with that vendor.
- We may use unaffiliated companies to assist in providing our products and services to customers.
- We may share your personally identifiable information with outside companies that perform services on our behalf. For example, we may retain an outside company to manage a database containing certain customer information or to create and distribute an offering by telephone, mail or e-mail. In those situations, the outside party is performing work for BOSCOV'S, and BOSCOV'S takes appropriate steps designed to ensure your information is used only to provide the services requested by BOSCOV'S, and not for other purposes.
- Additionally, BOSCOV'S may share account or other information when we believe it is necessary to comply with law or to protect our interests or property. This may include sharing information with other companies, lawyers, credit bureaus, agents or government agencies in connection with issues related to fraud, credit or debt collection.
- Finally, BOSCOV'S may share your personal information with unrelated outside companies so that they can directly market their products or services to you if we feel that a company offers products or services that we believe may be of interest. We may also provide you with the opportunity to sign up at Boscovs.com in order to receive offers by e-mail.

You should know that certain information (for example, your name, address and phone number) may still be shared with unaffiliated third parties when it is required to complete a purchase or to provide special services you request. Your transaction or request is our authorization to provide this information to third parties regardless of your or your joint account holder's previous request to opt-out but only for this transaction or request.

Because cookies are specific to each computer that you use to access boscovs.com, you must turn off the collection of shopping experience data by opting out of our use to this data should you decide you do not want us to use this data to enhance your shopping experience. Please note that any request that you make to opt-out of our disclosure of data does not also turn off the Coremetrics cookie, as you must do that from your own computer.

IS MY INFORMATION SECURE?

BOSCOV'S is committed to doing its best to maintain the security of information collected. To try to prevent unauthorized access, maintain data accuracy, and ensure the correct use of information, we have put in place physical, electronic, and managerial procedures to safeguard and secure the information we collect.

We restrict access to nonpublic personal information about you to those employees who need to know that information to provide products or services to you. We maintain physical, electronic, and procedural safeguards to guard your nonpublic personal information.

Private electronic account and customer information is located on a secured server behind a firewall; it is not directly connected to the Internet. The firewall meets or exceeds recognized industry standards.

WHAT ABOUT INFORMATION ABOUT CHILDREN?

The Children's Online Privacy Protection Act took effect on April 21, 2000 and person authorized to use this account. You have the right to pay the total New Balance of the account in full within 25 days of the billing date without incurring a FINANCE CHARGE, or at your option, pay at least the "Minimum Payments" as indicated on your monthly statement and described below.

Regular minimum payment = 1/20th of the new balance rounded up to the next $5.00, but not less than $10.00 or the balance if less than $10.00.

Major Purchase minimum payment = 1/36th of the new balance rounded up to the next $5.00 in the billing period in which you made your last purchase, but not less than $10.00 or the balance if less than $10.00. Usage of the major purchase plan is limited to certain purchases in excess of $300.00 in certain departments. See store for details.

Credit plans with more favorable minimum payment terms may be available from time to time. See stores for details.

All payments made on your BOSCOV'S Charge Account will be applied to your oldest credit plan requiring payments first until the monthly minimum payments are satisfied. Any payment, which exceeds the minimum payment, will be applied to your oldest credit plan on which minimum monthly payments are required and then to your oldest credit plan on which minimum monthly payments and/or FINANCE CHARGES have been deferred. All payments are applied toward your balance in the following order.

1. Unpaid FINANCE CHARGE. 2. Unpaid late fees/Return check fee. 3. Unpaid insurance premiums due. 4. Account principle. 5. Unbilled transactions.

If you pay more than your minimum payment required, but less then the balance, the excess portion of the payment will be applied to your next month's minimum payment required. The excess portion is defined as a "pre-paid" amount. Therefore, if you paid more than your minimum due last month, the current

FIG. 5D

In the event that some or all of the business assets of BOSCOV'S are sold or transferred, we may transfer the corresponding information about our customers.

EXPLANATION OF OPT-OUT RIGHTS

If you prefer that we not disclose certain personal information about you, you may opt-out of those disclosures; that is, you may direct us not to make those disclosures (other than disclosures permitted by law or otherwise exempt from your opt-out rights). If you wish to opt out of disclosures of nonpublic personal information to unaffiliated companies, you may call the following toll-free number 1-800-755-2884. If you wish to opt out of disclosure of credit information (other than your credit experience with us) between affiliate companies within BOSCOV'S, you may call the same toll-free number 1-800-755-2884.

If you share access to or responsibility for your BOSCOV'S credit card account with some one else, either party may exercise their opt-out rights. If either party exercises the opt-out right, none of your information associated with the joint account will be disclosed (other than disclosures permitted by law or otherwise exempt from your opt-out rights).

Once you have submitted your request you should assume that it has been successfully received and your request is being processed. Please allow us 60 calendar days from your request to complete the removal, as some of our promotions may already have been in process before you submitted your request imposes certain requirements on web sites directed toward children under 13 that collect information on those children, or on web sites that knowingly collect information on children under the age of 13. Boscovs.com web site is not directed toward children under 13 and it is our site's policy not to collect personal information on any person under 13.

PRIVACY POLICY CHANGES

We may change this Privacy Policy from time to time. When such a change is made, we will post a revised version on the Boscovs.com web site and make it available at our locations. Changes will be effective when they are posted. It is your responsibility to review this Privacy Policy from time to time to be aware of any such change. Your continued use of any of BOSCOV'S services, including Boscovs.com, will indicate your agreement to any such change.

This Privacy Policy was last updated August 3, 2002. Please check back periodically for updates and changes.

BOSCOV'S RETAIL CREDIT AGREEMENT.

In this Agreement the term "You" refers to each person to whom a card is issued or authorized to use it. "Us" and "W" refer to BOSCOV'S Credit Card Master Trust. The Agreement applies to all BOSCOV'S Proprietary Account Credit Plans. You agree to the following:

1. PAYMENTS - You will pay for all purchases made by yourself or any other payment may be reduced or pre-paid in full. FINANCE CHARGES will continue to accrue.

All past due amounts will be added to the minimum due. Payments will be accepted at BOSCOV'S Credit Office, P.O. Box 13700, Philadelphia, PA 19191-0002 or at any BOSCOV'S Store.

2. FINANCE CHARGES not in excess of those permitted by law will be assessed on the outstanding balance of your account from month to month. You pay no FINANCE CHARGE in any billing period for which there is no previous balance or during which the sum of your payments and credits was at least equal to the previous balance. We compute your FINANCE CHARGE by multiplying the average daily balance shown on your statement by the periodic rates listed below. From time to time, we may offer "Deferred FINANCE CHARGE Plans (DFRPs)". Interest on DFRPs will accrue from the date of this Purchase. FINANCE CHARGE deferral is for the period specified in the advertising. If this purchase is paid in full before the deferral period expires, accrued FINANCE CHARGES will be waived; otherwise all accrued FINANCE CHARGES will be assessed to your account and will be payable according to this Agreement. There will be a minimum FINANCE CHARGE of $.50 (Except for residents of Maryland).

3. LATE PAYMENT FEES - may be applied to any account as allowed by

FIG. 5E law, when a payment is not made by the Due Date indicated on your monthly statement and during each subsequent billing cycle in which the payment remains unpaid. The late payment fee may be up to $25.00, subject to state law limitations. We have the right to waive, defer, or reduce this Late Fee based among other factors, on the balance of your account. If we do so, we will not lose our right to impose the maximum Late Fee in later billing periods.

This Late Fee is separate and in addition to any FINANCE CHARGES which may be assessed. As always, if you maintain a current account you WILL NOT be charged a late payment fee.

4. SMALL BALANCE POLICY - Balances from $0.01 to $0.99 that remain on the account for more than 26 days will be automatically credited to your account. Credit Balances from -$0.01 to -$0.99 that remain on the account for more than 26 days will not be refunded.

5. AVERAGE DAILY BALANCE - To calculate the "average daily balance" we take the beginning balance of your account each day, add any new purchases and subtract any payments and credits. This is the daily principal balance. We then add all the daily principal balances for the billing cycle and divide the total by the number of days in the billing cycle. This results in the "average daily balance".

6. MINIMUM PURCHASE - There is no minimum purchase requirement on your regular plan. The minimum allowable purchase on your Major Purchase Plan is $300.00. Major Purchases are limited to certain types of merchandise and/or services.

7. CHANGE OF TERMS - We can change credit terms at any time. We will notify you in advance of any such changes as required by law. The new terms may be applied to your unpaid balance as well as any new purchases to the extent permitted by applicable law. This Agreement replaces all prior Agreements.

12. CUSTOMER INFORMATION - You give us and any holder of this Agreement permission to furnish information about you to other persons who may use this information to solicit you for products or services. You can request that we discontinue furnishing this information by writing to us at P.O. Box 4274, Reading, PA 19606.

13. CREDIT CARD(S) - The credit card(s) issued to you remain Boscov's property and must be returned to Boscov's upon request. Proper use of the card(s) is your responsibility.

14. CHARGE SLIPS - You will sign a charge slip at the time of each purchase made in one of our stores, and in the case of purchases made by telephone, mail, or internet you will accept our sales slip evidencing such sale and/or our records of delivery of the merchandise and/or service as conclusive evidence of such sale and/or delivery. You authorize us as your agent to sign such sales slips on your behalf in the case of telephone, mail, or internet purchases of merchandise and/or services.

15. CREDIT REPORTS AND DISCLOSURES - We have the right to investigate and verify the application information you have provided. We may request consumer reports from a consumer reporting agency in considering your application and for the purpose of an update, renewal or additional extension of credit. We have the right to lower your credit limit or close your account if your credit report no longer meets our credit criteria. Upon request, we will tell you if we obtained a consumer report and provide you with the name and address of the reporting agency. We may furnish information concerning your account to consumer reporting agencies or others who may lawfully receive such information. If you think the information we reported to a credit reporting agency is wrong, or if you need more information about the information reported, you must write to us on a separate sheet at P.O. Box 4202, Reading, PA 19606. Write us as soon as possible.

Agreement.

THE LAW REQUIRES US TO GIVE YOU THE FOLLOWING NOTICES:

Maryland: Our charge account program for Maryland customers is subject to the provisions of Subtitle 9 of Title 12 of the Commercial Law Article of the Maryland Code.

Notice: Any Holder of this consumer contract is subject to all claims and defenses which the debtor could assert against the seller of goods or services obtained pursuant hereto or with the proceeds hereof. Recovery hereunder by the debtor shall not exceed amounts paid by the debtor hereunder.

FIG.5F

8. CHANGE OF RESIDENCE - If you change your residence, you must tell us in writing promptly. If you move to another state, the account, including any unpaid balance, will be controlled by the credit terms in that state for DE, PA, NJ, NY and MD; in all other states the account will be controlled by the credit terms in PA. We will provide you with a written disclosure of any new terms as the law requires.

9. PAST DUE PAYMENTS - If you do not pay to us what you promised to pay for the minimum monthly payments, we may declare your entire balance due and payable, subject to any rights you have by State law to correct your nonpayment. We may refer your account to an outside agency or attorney for collection. You agree to pay reasonable attorney's fees and court costs to BOSCOV'S associated with the collection of your account as permitted by law. We may also terminate the FINANCE CHARGE and/or payment deferral period of any plan.

10. SECURITY INTEREST - Except in New York, where we do not take any security interest, we reserve a security interest in all goods and/or services purchased until such goods and/or services are paid in full.

11. CALL MONITORING - To insure you receive accurate and courteous customer service, on occasion your call will be monitored and/or recorded. You consent to such monitoring and/or recording.

In your letter, give us the following information: "Your name and account number. • Describe the error and explain. If you can, why you believe there is an error. If you need more information, describe the item as it appears on your credit bureau report.

16. LOST OR STOLEN CREDIT CARD(S) - If you believe your credit card(s) is lost or stolen or has been used without your permission, you agree to notify us immediately and to cooperate in giving the facts as to the unauthorized use of the card(s).

17. RETURNED CHECKS - If any check you present to us is returned unpaid, you agree to have it charged back and subject to the terms of your account Agreement, plus a reasonable resumed check fee as permitted by law. The returned check fee for all states except MD will be $15.00. The returned check fee for MD will be $10.00.

18. LIABILITY - If this is a joint account, both of you agree to be bound by the terms of this Agreement and each of you agrees to be both jointly and severally liable for payment of all purchases under this Agreement.

19. BREACH OF CONTRACT - No delay, omission, or waiver in the enforcement of any provision of this Agreement by us will be deemed to be a waiver of any subsequent breach of such provision or of any other provision of the

DISCLOSURE TABLE

| | |
|---|---|
| Annual Percentage Rate (APR) for Purchases | Preferred Rate: 12.99% APR as of 05/31/04.† |
| Other APRs | Balance Transfer APR: Fixed 0% APR for the first 12 billing cycles after your account is opened.*† After that your Preferred Rate, 12.99% APR as of 05/31/04. Cash Advance APR-Preferred Rate: 19.99% as of 05/31/04. Non-Preferred Rate APR: up to 23.99% as of 05/31/04 (see explanation below).**† |
| Variable Rate Information | Your APRs may vary. The APR for purchases and balance transfers is the greater of 12.99% or 11% over the Index Rate.*** The APR for cash advances is the greater of 19.99% or 18% over the Index Rate.*** The Non-Preferred Rate APR is the greater of up to 23.99% or the Index Rate plus a margin in the range of 8% to 22%.*** |
| Grace Period for New Purchases | 25 Days |
| Balance Calculation Method for Purchases | Average Daily Balance (including new purchases) |
| Annual Fee | None |
| Minimum Finance Charge | $1.75 (any month a finance charge is imposed). |
| Annual Percentage Rate (APR) for Purchases | up to 21.0% APR |
| Periodic Rate | up to 1.75% |
| Grace Period for Repayment for Balances of Purchases | You have 25 days to repay your purchase before a FINANCE CHARGE will be assessed. |
| Method of Computing the Balance for Purchases | Average Daily Balance Method (including current purchases) |
| Minimum Finance Charge | Residents of MD: NONE<br>All Other States: $0.50 |
| Late Payment Fee | All States: Up to $25 |
| Returned Check Fee | Residents of MD: $10.00<br>All Other States: $15.00 |

AUTHORIZATIONS, TERMS AND CONDITIONS:
IMPORTANT FIRST NATIONAL BANK OF OMAHA CREDIT TERMS:
Transaction Fee for Cash Advances and Cash Advance Checks:
The greater of $15 or 3% of the transaction (the greater of $15 or 5% of the transaction for certain "Cash Equivalent Transactions").
Transaction Fee for Balance Transfers and Balance transfer Checks: None.
Over Limit Fee: $35
Late Payment Fee: $29 for new balances less than $500; $35 for new balances equal to or greater than $500 and less than $1,000; $39 for new balance greater than $1,000.
*Introductory Rate or Special Rate: Your introductory rate or special rate may terminate and increase to the disclosed Preferred Rate for purchases and balance transfers. If you fail to make a minimum payment to us or any other creditor when due, you exceed your credit limit or make a payment that is dishonored for any reason during the introductory rate period or special rate period.
**Non-Preferred Rate: The APR for purchases, balance transfers, and cash advances may vary and increase to a higher APR (including any introductory rate or special rate) if you fail to make a minimum payment to us or any other creditor when due, you exceed your credit limit or you make a payment that is dishonored for any reason.
+ Factors considered in determining whether you qualify for Non-Preferred Rates or you qualify to have your introductory rate or special rate increased to Preferred Rates may include the length of time your account has been open and account usage, performance and delinquency patterns with us or with your other creditors.
***The Index Rate is the highest one-month London Interbank Offered Rate as quoted in the Wall Street Journal on any day during the prior 90-day period.

By applying for a Boscov's Rewards Visa® Card with First National Bank of Omaha & Boscov's, you agree to the following:
You understand that the Boscov's Rewards Visa® Card will allow you to access two separate accounts -- a Boscov's Account and a Visa® Account. The Boscov's Account is provided by Boscov's and its terms are set forth in this application. The Visa® Account is provided by First National Bank of Omaha ("FNB") and the initial disclosure statement will be provided in a cardmember agreement sent with the plastic(s). You understand and agree that you must comply with each separate set of terms. First National Bank will first consider you for a Boscov's Rewards Visa © Card. If you do not qualify for a Boscov's Rewards Visa © Card, Boscov's will consider you for a Boscov's proprietary credit card.

OHIO RESIDENTS: The Ohio laws against discrimination require that all creditors make credit equally available to all creditworthy customers and that credit-reporting agencies maintain separate credit histories on each individual upon request. The Ohio Civil Rights Commission administers compliance with this law.

NOTICE TO MARRIED WISCONSIN APPLICANTS: If you are a married WI resident and applying for separate credit, you must Bankcard at P.O. Box 3696, Omaha, NE 68172-9936.

CALIFORNIA RESIDENTS: The applicant, if married, may apply for a separate account. After credit approval, each applicant shall have the right to use this account to the extent of any credit limit set by the creditor and each applicant may be liable for all amounts of credit extended under this account to each joint applicant.

NEW YORK RESIDENTS may contact the New York state banking department to obtain a comparative listing of credit card rates, fees and grace periods. New York State Banking Department: 1-800-518-8866.

The information about the costs of the card described in this application is accurate as of May 31, 2004. This information may have changed after that date. To find out what may have changed, write First Bankcard, P.O. Box

FIG.6C

Credit Reports: By applying for this account you agree that First Bankcard may obtain credit reports for purposes of processing your application and for later purposes related to your account such as reviewing, updating and renewing it, increasing the credit line and collecting. If you request, you will be informed of whether or not a credit report was requested and of the name and address of the consumer reporting agency that furnished the report. You also authorize First Bankcard to verify your employment, income and other relevant information.

IMPORTANT INFORMATION ABOUT PROCEDURES FOR OPENING A NEW ACCOUNT: To help the government fight the funding of terrorism and money laundering activities, the USA Patriot Act requires all financial institutions to obtain, verify, and record information that identifies each person (including business entities) who opens an account.

What this means for you: When you open an account, we will ask for your name, physical address, date of birth, taxpayer identification number, and other information that will allow us to identify you. We may also ask to see your driver's license or other identifying documents. We will let you know if additional information is required.

provide information about your spouse. No provision of any marital property agreement, unilateral statement under S.766.59 Wis. Stats. or court decree under S.766.70, Wis. Stats. adversely affects the interest of the creditor unless the creditor, prior to the time the credit is granted or an open-end credit plan is entered into, is furnished a copy of the agreement, statement, or decree, or has actual knowledge of the adverse provision. Married Wisconsin residents applying for credit separately and residing at different addresses must furnish name and address of their spouse to First

3696, Omaha Nebraska 68172-9936. Boscov's Rewards Visa® Cards are issued by First Bankcard, a division of First National Bank of Omaha.

NOTICE TO THE BUYER:
1) Do not sign this Credit Agreement before you read it or if it contains any blank space.
2) You are entitled to a completely filled in copy of this Credit Agreement.
3) You may at any time pay your total indebtedness under this Agreement.

BOSCOV'S INSTANT CREDIT APPLICATION

APPLICANT INFORMATION | TO BE COMPLETED BY SALES ASSOCIATE

Boscov's will only process applications with U.S. or Canadian addresses

Store Number _____ Co-Worker Number _____

First Name _____ Middle Initial _____ Last Name _____

Driver Licence Number _____ DL State _____ DL Expiration _____

Street Address _____ Apt# _____

Reference Number _____ Account Number _____

City _____ State _____ Zip _____

CO-APPLICANT INFORMATION

Social Security Number _____ Mother's Maiden Name _____

First Name _____ Middle Initial _____ Last Name _____

Date of Birth _____

Co-Applicant's Social Security Number _____ Co-Applicant's Date of Birth _____

E-Mail Address _____ Home Phone Number _____

Co-Applicant's Signature _____ Date _____

Employer's Name _____

YOU ARE APPLYING FOR A CREDIT CARD. FIRST NATIONAL BANK WILL FIRST CONSIDER YOU FOR A BOSCOV'S REWARDS VISA®. IF YOU DO NOT QUALIFY FOR A BOSCOV'S REWARDS VISA® CARD, BOSCOV'S WILL CONSIDER YOU FOR A BOSCOV'S PROPRIETARY CREDIT CARD.

Employer's Phone Number _____

You certify that all information provided is true and complete and agree to be bound by all terms and conditions of the cardmember agreement that will be sent with the Boscov's Visa® plastic(s).

X _____ Applicant Signature _____ Date _____

☐ Consider me for a Boscov's Proprietary Credit Card Only.

See the enclosed "Disclosure Table" for additional information about rates, fees and other costs.

METHODS AND SYSTEM FOR PROVIDING MULTIPLE CREDIT LINES

This application is a continuation of U.S. patent application Ser. No. 10/986,165, filed Nov. 12, 2004, the entirety of which is incorporated by reference herein.

BACKGROUND OF THE INVENTION

1. Field of the Invention

The present invention relates to a method and system for providing multiple linked credit lines or debit accounts based on a single application, and for issuing a common access device for access to all linked accounts.

2. Background of the Technology

An access device for an electronic transaction refers to any card, plate, code, account number, electronic serial number, personal identification number, or other telecommunications service, equipment or instrumental identifier, or other means of account access including, but not limited to smart cards, electronic tokens and Radio Frequency key-fobs, that can be used to obtain money, goods, services, or anything of value, or to initiate an electronic funds transfer. Lines of credit (referred to interchangeably herein as "credit"), and associated credit access devices (referred to interchangeably herein as "credit cards") are available to credit applicants upon approval by the credit provider. Examples of credit cards include cards available through financial institutions on the VISA® network (registered and operated by VISA of San Francisco, Calif., USA) or MasterCard® network (registered and operated by MasterCard of Purchase, N.Y., USA) (collectively referred to herein as "general purpose credit networks"), and cards available through private businesses, for example, retail and department stores (e.g., Boscov's Department Stores). Debit accounts (interchangeably referred to herein as "debit"), and associated debit access devices (interchangeably referred to herein as "debit cards"), such as those available through financial lenders, e.g., banks, credit unions or other financial institutions (interchangeably referred to herein as "debit providers"), are available to debit applicants approved by the debit provider. Credit and debit are collectively referred to herein as "credit/debit" and credit providers and debit providers are collectively referred to as "credit/debit providers" or "access device providers."

In order to obtain approval of an access device application, applicants must enter and satisfy a qualification process including an approval process or an industry standard underwriting process and/or verification or validation of additional data, as set forth by access device providers or as generally required by access device providers in the industry. Typically, credit/debit applicants apply for a line of credit or a debit account by submitting personal and financial information to the credit/debit providers via credit/debit applications. Credit/debit applications are usually submitted to credit/debit providers via the telephone, mail, via a computer network, such as the World Wide Web or Internet, or in person, such as at a retailers point of sale or a bank's branch location. The credit/debit providers then assess the application using pre-defined business-specific guidelines to determine whether the applicant qualifies for credit/debit, and if so, the extent of the line of credit or debit account. Upon an affirmative determination by the credit/debit provider, which may be reached virtually instantaneously in some cases, the credit/debit provider issues a credit/debit card to the applicant with a line of credit or debit account. Conversely, upon a negative determination, the credit/debit provider rejects the applicant and withholds the issuance of a credit/debit card. Typically, the qualifications for debit accounts are substantially different from the qualifications for lines of credit.

Once an application for an access device has been approved, the access device providers typically provide approved applicants with an access device associated with a respective account. In addition, access device providers usually provide approved applicants with incentives or rewards programs (e.g., cash back, discounted merchandise, frequent flyer miles, or proprietary credit) that accumulate through use of the access device.

Generally, an applicant completes a credit/debit application in order to attempt to qualify for one line of credit or one debit account (i.e., one access device). However, it is known in the art that a single application may be used to qualify an applicant for multiple credit lines or multiple debit accounts. Assessment of a single application based on multiple criteria, such as credit risk or solvency, for example, is generally known as a "multipurpose credit/debit application" or a "multipurpose access device application." The multipurpose credit/debit application is used in the credit/debit industry, although this type of application is much less common than a single purpose application, and is referred to herein as the "multipurpose model."

Under the multipurpose model, the credit/debit applicant fills out a single application that is subsequently processed through a series of credit (and, where applicable, debit) qualification options (also referred to herein as a "cascade" of qualifications or a "qualification process"). For instance, with respect to the credit application, the single application is first processed for credit qualification under a first credit qualification threshold (e.g., a Platinum Card) having an associated spending limit, wherein the applicant is assessed for a predetermined amount of credit. The process provides an ultimate resolution of whether the applicant has been approved for the amount of credit associated with the Platinum Card (i.e., whether the applicant meets the "underwriting threshold"). If the applicant fails to qualify for the Platinum Card, the single application is subsequently processed for credit qualification under a second credit underwriting threshold (e.g., a Gold Card), and accordingly, a resolution is reached with respect to that underwriting threshold. This process is repeated for a plurality of credit qualification options available, typically ending with processing of the application against the lowest credit underwriting threshold, often a standard credit card offered by a single issuer.

It is also known in the art that a single multipurpose credit/debit application may be used to process credit/debit qualifications for multiple credit/debit providers, each of which independently assesses the application to determine approval or rejection. Under this scenario, the credit/debit providers independently process the application and award credit lines or debit accounts without interacting with each other. Multiple credit/debit cards are thus issued from the same application. Furthermore, the credit/debit providers do not share profits, rewards programs, or the ability to interconnect linked accounts on the same credit card.

There remains an unmet need for a multipurpose access device application assessed by access device providers acting in cooperation with each other, which, if approved, would result in a single common multipurpose access device (referred to as a "dual purpose access device" where the number of access device providers is two), linking accounts from separate access device providers. Furthermore, there is an unmet need in the art for a multipurpose access device that links multiple accounts in one access device, while also linking the incentive/rewards programs offered by each access device provider into one access device.

Additionally, there is an unmet need in the art for a system and method of use that allow a multipurpose access device application assessing credit/debit qualifications for applicants under guidelines provided by multiple access device providers. Specifically, there is an unmet need in the art for a credit/debit approval system to process a single application for approval of multiple credit lines or debit accounts provided by multiple credit/debit providers operating in cooperation with each other.

SUMMARY OF THE INVENTION

The present invention provides a multipurpose access device application, available, for example, at the point of sale, which allows an applicant to apply for multiple access devices, each provided by a different access device provider, which may, for instance, be unaffiliated with one another, within a single application. One embodiment of the present invention provides a common multipurpose credit/debit card, wherein one credit/debit card accesses at least two credit/debit accounts. In one variation, at least one credit/debit account on the common credit/debit card is provided by a retail store, which also optimally provides the credit/debit application at the point of sale. In one embodiment of the present invention, if the credit/debit applicant meets the criteria of one credit/debit provider only (this typically occurs when only the retailer approves the credit/debit application), a credit/debit card will still be issued that is associated with a line of credit provided by the single approving credit/debit provider (e.g., the retailer). Thus, in this embodiment, the credit line provided by the retail store is applicable to purchases made within the retail store only. In another variation upon approval by a second credit/debit provider, a linked credit/debit account is provided by each credit/debit provider, the second credit provider (e.g., a retailer) being linked, for example, to a general purpose credit network, such as VISA® or MasterCard®, or to a debit provider linked to a financial institution.

In another embodiment of the present invention, the common access device combines the rewards programs provided by each access device provider, wherein the consumer using the access device accumulates rewards, usable under each provider's rewards program, in any given use of the credit/debit card (e.g., whether used in the retail store or elsewhere).

Another embodiment of the present invention provides for associated rewards programs, i.e., rewards programs that accumulate rewards separately for each issuer of the common access device, which are developed jointly by all issuers.

Yet another embodiment of the present invention provides a method for processing a single application to determine approval of credit/debit from multiple credit/debit providers. Thus, the application is reviewed under criteria provided by different credit/debit providers. For example, if the applicant is approved under the criteria provided by a first credit/debit provider, the method of the present invention provides for processing the single application a second time to determine approval from the second credit/debit provider. Alternatively, the application is processed a second time, regardless of whether the first process was approved. In one embodiment, the approval processes conducted under the criteria provided by the different credit/debit providers may be conducted concurrently, rather than sequentially. The approval process continues until the application assessment with respect to each credit/debit provider, or a predetermined number of credit/debit providers, is completed. One credit/debit card is issued incorporating the credit/debit terms and limits of each and every approved credit/debit provider.

Other features and advantages of the present invention will become apparent from the following detailed description considered in connection with the accompanying drawings, which disclose multiple embodiments of the present invention. It should be understood, however, that the drawings are designed for the purpose of illustration only and not as a definition of the limits of the invention. Additional advantages and novel features of the invention will also become more apparent to those skilled in the art upon examination of the following or upon learning by practice of the invention.

BRIEF DESCRIPTION OF THE DRAWINGS

In the drawings:

FIG. 3 presents an example flow diagram of functions performed for access device application and approval in accordance with an embodiment of the present invention.

FIGS. 5A-F provide an exemplary retail credit agreement, for use in accordance with an embodiment of the present invention.

FIGS. 6A-C present an exemplary credit card term sheet, in accordance with an embodiment of the present invention.

FIG. 7 illustrates a sample credit application, in accordance with one embodiment of the present invention.

DETAILED DESCRIPTION

Figure 1:
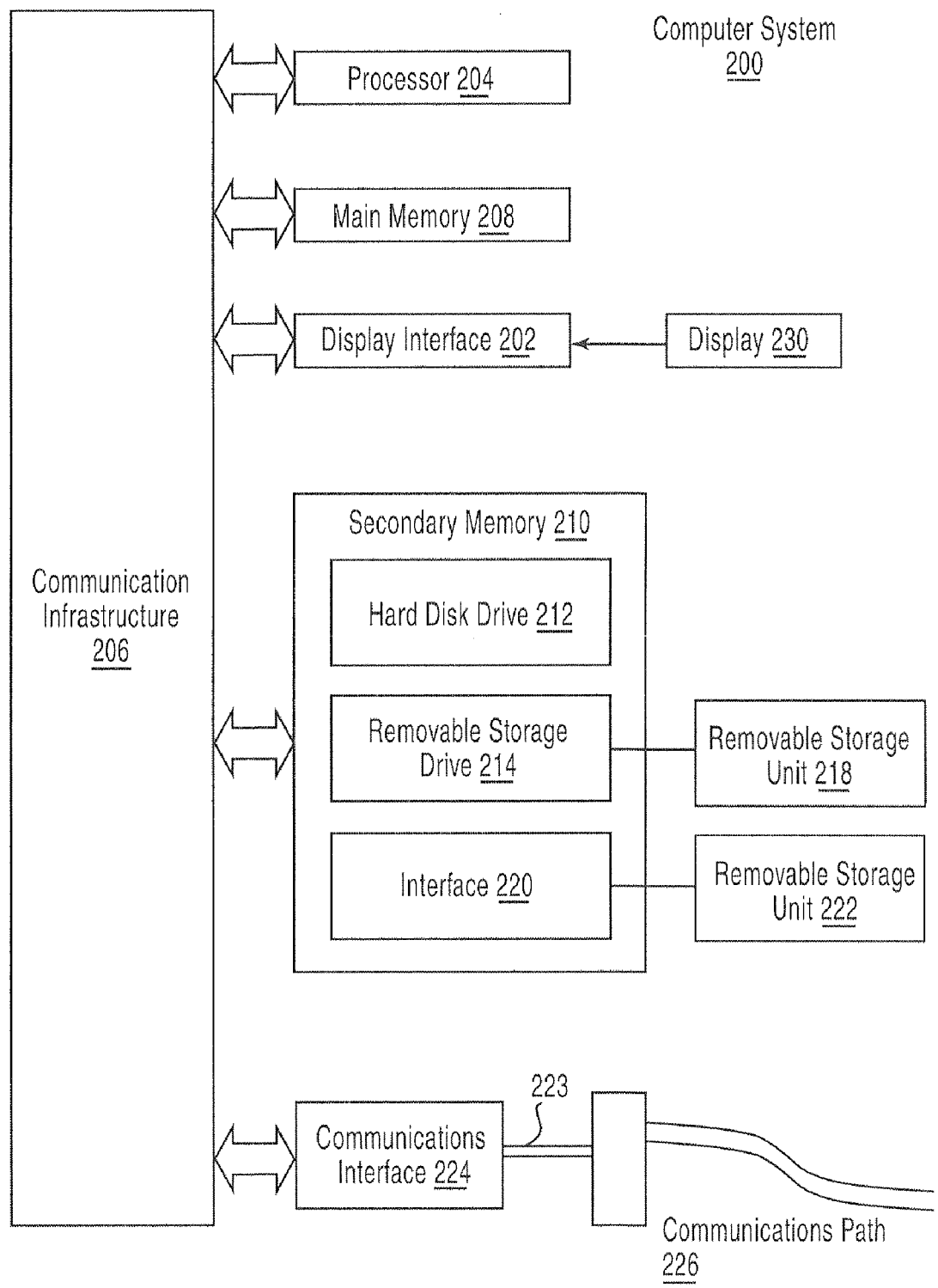
FIG. 1 presents an exemplary system diagram of various hardware components and other features, in accordance with an embodiment of the present invention.

The present invention provides a method and system for applying for and providing an access device, whereby an applicant completes a multipurpose access device application that is reviewed under qualification processes established by multiple access device providers. Upon a positive result from the review, the present invention provides for establishing a linked account for the access device providers.

Further, the present invention provides for establishing a single access device account if the multipurpose application is approved by only one access device provider.

A further advantage of the present invention is that it provides the credit/debit cardholder with the ease and simplicity of using a common credit/debit card linking the multiple credit/debit lines under a single account number or under multiple account numbers. The multipurpose credit/debit card features access to multiple credit lines and debit accounts with the convenience of one common credit/debit card.

Yet another advantage of the present invention is that it provides the credit/debit card user with the added benefit of a joint incentive program for the linked credit/debit account for which a common credit/debit card is issued, linking the incentive programs of the multiple credit/debit providers. As an example only, rewards earned using the card may be double counted or multiple counted (e.g., frequent flier miles earned by using a VISA® card through a retail purchase also translate into a proportional amount of store credit at the department store that is an additional credit/debit provider on the card).

The method and system of the present invention offer a number of additional benefits over the prior art. The multipurpose credit/debit card provides cardholders with the convenience, credit/debit advantages, brand loyalty, and goodwill commonly associated with a retail card, which may be directly linked to a merchant or retailer, with the credit/debit advantages and international acceptability of a credit line based on a general purpose credit network, such VISA® or MasterCard® or the like, or a debit account. In addition, in one variation, the credit/debit card provides a regularly published statement for each of the credit/debit providers, or alternatively, the statements are consolidated into one regularly issued (e.g., monthly) statement. Another advantage to the multipurpose credit/debit card of the present invention is that each credit line or debit restriction on the card may be independent of the others. Thus, adverse events with respect to each credit line or debit account do not affect the other credit lines or debit accounts. A further advantage of the method and system of the present invention is that the credit/debit providers that issue the linked credit/debit accounts on the single credit/debit card may enter into a profit sharing agreement with each other.

The present invention contains features that address the following areas, among others: 1) processing of a single multipurpose application by multiple access device providers, acting in cooperation with each other; 2) upon approval of the multipurpose application, issuing a common access device linking multiple accounts of the approving access device providers; and 3) joining the incentive and/or rewards programs associated with each access device provider in a single incentive and/or rewards program linked with the common access device (e.g., regardless of location used).

Example embodiments will now be described in conjunction with the appended figures.

Integrated Solution for Credit/Debit Application and Approval

The present invention may be implemented using hardware, software or a combination thereof and may be implemented in one or more computer systems or other processing systems. In one embodiment, the invention is directed toward one or more computer systems capable of carrying out the functionality described herein. An example of such a computer system 200 is shown in FIG. 1.

Computer system 200 includes one or more processors, such as processor 204. The processor 204 is connected to a communication infrastructure 206 (e.g., a communications bus, cross-over bar, or network). Various software embodiments are described in terms of this exemplary computer system. It will be apparent to a person skilled in the relevant arts how to implement the invention using other computer systems and/or architectures, after reading the description contained herein.

Computer system 200 can include a display interface 202 that forwards graphics, text, and other data from the communication infrastructure 206 (or from a frame buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner, Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. The terms "computer program medium" and "computer usable medium" are used herein to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 2:
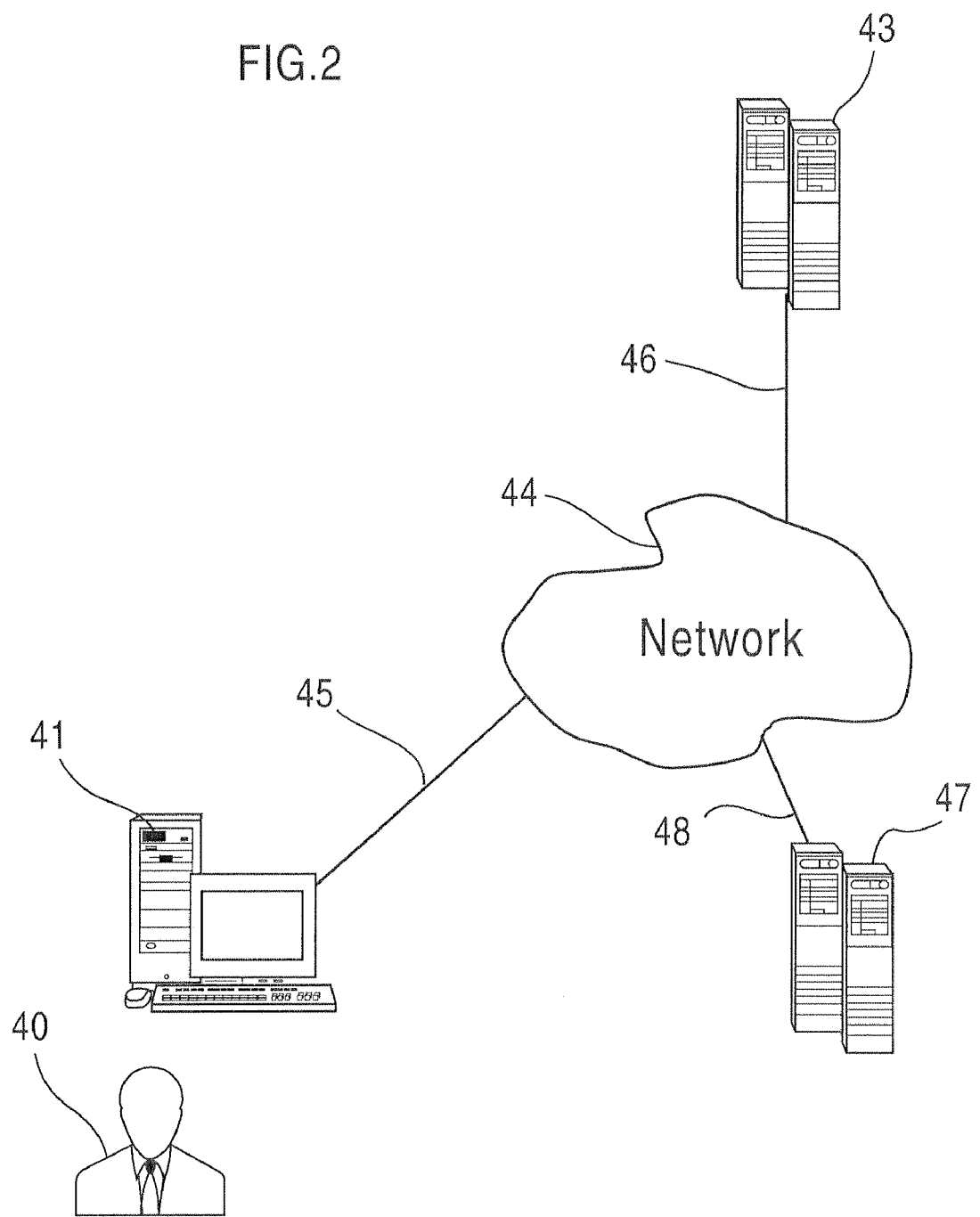
FIG. 2 shows various features of an example networked computer system, including various hardware components and other features for use in conjunction with an embodiment of the present invention.

As shown in FIG. 2, the system of an embodiment of the present invention for applying for and obtaining credit/debit operates, for example, via a network 44. A user 40, such as an applicant for credit/debit or an application processor inputs information, via a terminal 41, such as a personal computer (PC), minicomputer, mainframe computer, microcomputer, telephone device, personal digital assistant (PDA), or other device having a processor and input capability. Application processing or network access may originate from domestic or international locations.

As further shown in FIG. 2, in one embodiment, the terminal 41 is coupled to a server 43, such as a PC, minicomputer, mainframe computer, microcomputer, or other device having a processor and a repository for data or connection to a repository for maintained data, via a network 44, such as the Internet, via couplings 45, 46, such as wired, wireless, or fiber optic connections. Processing of the application, for example, occurs via the server 43.

Access Device Application and Approval

As shown in FIG. 3, in an embodiment, the system and method of the present invention initiate functionality with an applicant's completion of an application for the multipurpose credit/debit card 300. The application may be completed, for example, in person at the point of sale, via telephone, or via a network, such as the World Wide Web or Internet. The applicant's information (e.g., contained in a completed application) is forwarded via telephone or via a network, as described above, for analysis via a processing mechanism 302 (interchangeably referred to herein as the "pull bureau"). In one variation, the pull bureau initially assesses the application for basic requirements, such as applicant contact information. Each credit/debit provider may have a unique qualification process, marked by specific criteria to assess the basic requirements. Provided the application contains the elements required to process the application (i.e., the basic requirements are met) the pull bureau routes the processing of the application to the next step 304 with multiple underwriting tiers or qualification process centers 306, 308 and 310, for assessment per credit/debit qualification processes or guidelines set forth by each credit/debit provider. In another variation, there is no basic assessment, and the pull bureau proceeds to the next step 304 upon receiving any information from the applicant.

The application may be simultaneously routed to multiple tiers 312, 314 and 316, each tier serving as the credit/debit assessment for each credit/debit provider, in one variation of the present invention. In another variation, the routing proceeds serially from a first tier 312 to a second tier 314, and so forth, as required.

In one embodiment of the present invention, the pull bureau forwards the application to the first tier 312. The first tier 312 assesses the application on predetermined approval guidelines (e.g., a credit qualification rating or score for the applicant) 306. A line of credit or a debit account issues for each approved credit/debit provider and is embodied in a common credit/debit card 318. The system issues a record of rejecting the application for each credit/debit provider whose approval guidelines have not been met 320. In one embodiment, the statement 320 may be issued as a joint record for all credit/debit providers rejecting the application.

In one variation of the present invention, if a first credit/debit provider assessing the application 306 rejects the application, the system generates a notification of the position taken by the first credit/debit provider and terminates the application. In another variation, the first credit/debit provider rejects the applicant, but the system still forwards the application to subsequent tiers.

The pull bureau analyzes the multipurpose application on a number of criteria. As described above, one variation of the present invention allows the system and method to ensure that the basic, required information is provided prior to assessing subsequent information. In another variation of the present invention, the application is assessed based on the information predetermined by the credit/debit provider or on whatever information is presented by the applicant (interchangeably referred to herein as the "customer"). The application may be used for any number of purposes, such as mortgages or loans. The pull bureau determines the purpose of the application (i.e., whether the application should be processed for credit, debit, or other services, such as mortgages). Thus, the pull bureau routes the application to specific providers, as necessary.

Once the fundamental applicant information is provided, one variation of the present invention runs additional assessments of the applicant (e.g., whether the applicant is living or deceased). For example, if deceased, the system rejects the applicant's file and discontinues further processing.

After issuance of a common credit/debit card linking all approved accounts, one embodiment of the present invention includes establishment of a profit sharing arrangement among the credit/debit providers, although in some instances these credit providers are otherwise unaffiliated with one another. Thus, in this embodiment, the credit/debit providers are entitled to revenues, generated from use, interest or surcharges, for example, associated with the credit/debit card. For example, any use of the general purpose credit/debit card on the VISA® network, may be processed by the VISA® credit provider (e.g., a bank or financial institution), and any revenues generated from that use may be shared with the other credit credit/debit providers on the card and, in particular, the non-VISA® network credit/debit providers (e.g., the retailer). In another example, interest charges accumulated by the credit credit/debit user by using the general purpose credit/debit card, such as a card linked to the MasterCard® network, are shared among each credit/debit provider (also including the retailer, if appropriate) associated with the approved credit/debit card, regardless of where or how the credit/debit card user uses the card or incurs charges. Thus, for example, interest paid by a user on purchases made through the VISA® network, for instance, are shared with non-VISA® credit providers on the card. In one variation of the invention, each credit/debit provider establishes its own interest rate that may be linked to where and how a purchase was made. A bank, for instance, may select a relatively low interest rate on all purchases made using the credit/debit card outside of the retail outlet, and thus, the revenue received through the relatively low interest rate is shared among the other credit/debit providers on the card.

The method and system of the present invention permit credit/debit providers to create data files concerning applicant information, which, in turn, are used by the credit/debit providers to establish the approved accounts on their processing systems. In one variation, the credit/debit providers have the ability to share the data files with each other. The data exchanged among credit/debit providers facilitates the consolidation of customer services, billing, and rewards, for example, offered by multiple credit/debit providers via a common credit/debit card.

Figure 4A:
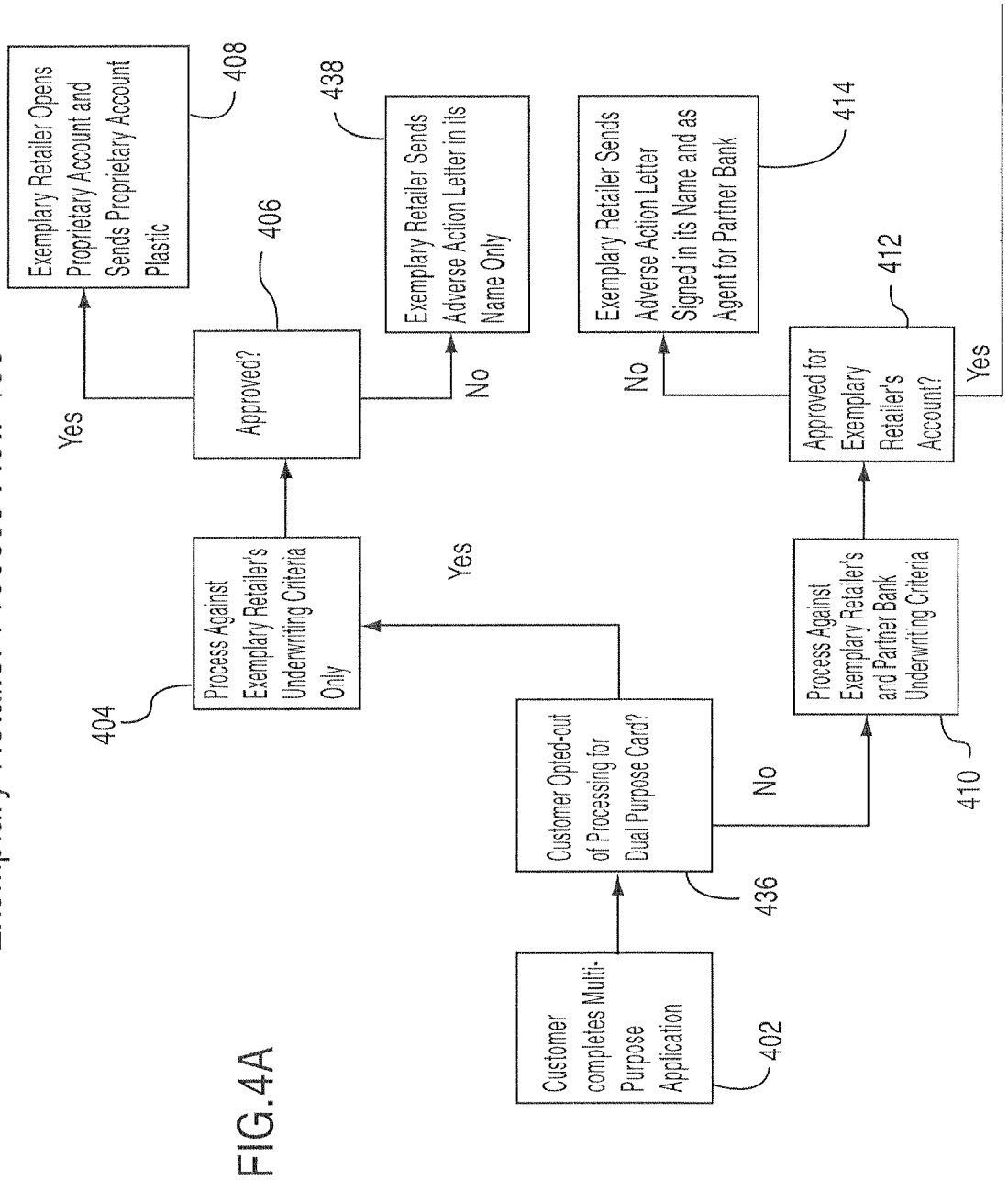
FIG. 4 presents an example flow diagram of functions performed for access device application and approval in accordance with an embodiment of the present invention specific to an exemplary retailer.
Figure 4B:
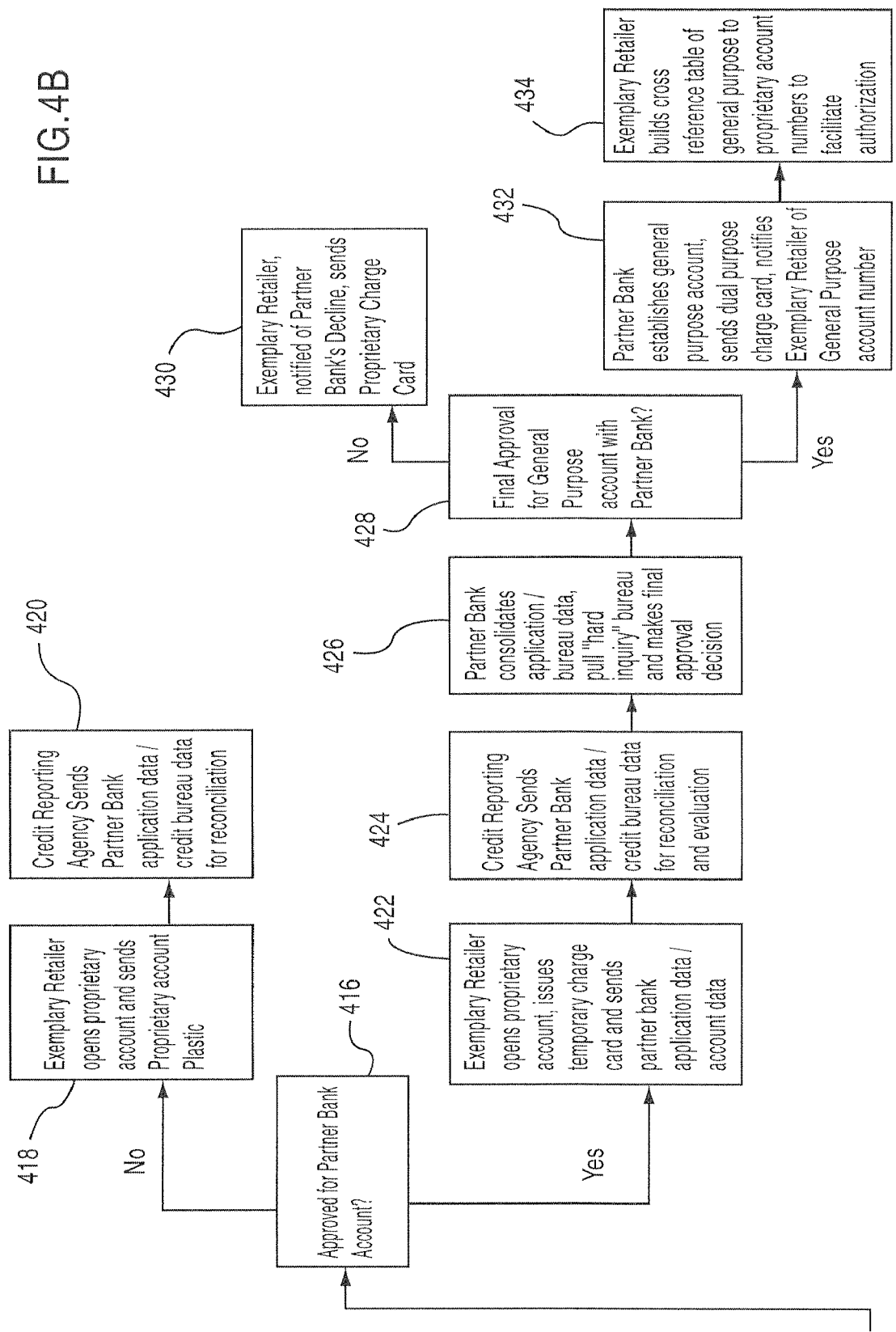

A flow diagram of an exemplary method of processing completed credit applications, specific to an exemplary retailer 400, such as a department store, in accordance with one embodiment of the present invention, is shown in FIG. 4. In this embodiment, after the customer has completed the multipurpose application 402, the system considers whether the customer has opted-out of processing for a dual-purpose card 436. An exemplary business specification for a multipurpose application for a dual-purpose credit card is illustrated below in Table 1.

If the customer has opted out, the application is processed only with respect to the retailer's underwriting criteria 404, and, if approved 406, the customer is issued a single retail charge card 408. Example criteria used by the retailer to process the application 404 are illustrated in Table 2 below. If the processing of the application 406 has not been approved using the retailer's criteria in Table 1, the retailer sends a letter declining credit to the customer 438, signed by the retailer only.

In this embodiment, if the customer has not opted-out of processing for a dual-purpose card 436, the system considers whether the customer is approved for a retailer's account 412. If the customer is declined credit, the retailer sends an Adverse Action letter signed on its own behalf and as agent for the partner financial institution 414. Conversely, if the application is approved for a retailer account, the system proceeds to check the application against the partner financial institution's underwriting criteria 416. If the application is declined credit/debit under the partner financial institution's underwriting criteria 416, the retailer opens a proprietary account only 418, and the Credit Reporting Agency sends the partner financial institution application data/credit bureau data for reconciliation 420. If the application is approved credit/debit under the partner financial institution's underwriting criteria 416, the retailer opens a proprietary account, issues a temporary charge card with a proprietary account number and sends the partner financial institution the customer application and account data 422. At this point, the Credit Reporting Agency sends the partner financial Institution application data/credit bureau data for reconciliation and evaluation 424. The partner financial institution proceeds to consolidate the application and bureau data and makes a final approval decision 426.

If final approval by the partner financial institution is issued 428, the partner financial institution establishes a general-purpose account, sends out the dual-purpose credit/debit card, and notifies the retailer of the general purpose account number 432. The retailer then proceeds to create a cross-reference table of issued general purpose to proprietary account numbers, to facilitate authorization 434. If the partner financial institution declines credit/debit, the retailer sends out a proprietary charge card 430. An example of the Reporting requirements for each transaction is illustrated in Table 3 below.

In the embodiment shown in FIG. 4, if an account is being upgraded from a proprietary to a dual-purpose account, the exemplary retailer does not establish a new account. Instead, the partner financial institution's account and the preexisting proprietary account are linked, if the applicant meets the partner financial institution's underwriting criteria. In this case, the pre-existing proprietary account is updated with the higher of the pre-existing credit/debit limit or the new credit/debit limit returned by the partner financial institution's underwriting criteria. It should be noted that applications may be "pended" (i.e., neither approved nor declined) by the retailer (e.g., for up to 30 days) prior to making the final decision. In these cases, the partner financial institution is informed of the pending status of the application and of the final decision, when made. Process flow continues as normal after the final decision is made.

An exemplary retail credit agreement, for use in accordance with an embodiment of the present invention, is illustrated in FIGS. 5A-5C. FIGS. 6A-6B illustrate an exemplary credit card term sheet, in accordance with an embodiment of the present invention. A sample credit application, in accordance with another embodiment of the present invention is shown in FIG. 7.

Example embodiments of the present invention have now been described in accordance with the above advantages. It will be appreciated that these examples are merely illustrative of the invention. Many variations and modifications will be apparent to those skilled in the art from the descriptions contained herein. It is intended that the scope of the invention be defined by the claims appended hereto.

TABLE 1

Customer Information

| Group Code (3 characters) | Group Description (40 character max) | Member Number | Member Number Description (30 character max) | Security Digits |
|---|---|---|---|---|
| 000 | PARTNER BANK Test Numeric | | Test Numeric Search | |
| 000 | PARTNER BANK Test Full/Alpha | | Test Alpha Abbreviated | |
| 000 | PARTNER BANK Numeric Search | | Production Numeric Search | |
| 000 | PARTNER BANK Full/Alpha Search | | Production Full/Alpha Search | |

Product Profile

| CAT TABLE | DIAL/IDNT SEGMENT | DECISON MATRIX |
|---|---|---|
| X Safescan | __ 24 Month Payment History | |
| __ Beacon 96 Enhanced | X Return M1 Only | __ Standard |
| __ Beacon | __ Process Joint/Spousal Requests | X Custom |
| __ Enhanced DAS | X Process Multiple Applicants Other: | __ None |

| ONDS | DATA SOURCES | INQUIRY | BILLING |
|---|---|---|---|
| X Models: 2825 Pinnacle 2.0 | X ACRO Exchange | Type: X Permissible __ Purpose | X |

TABLE 1-continued

|   |   |   | _ ONDL/I2000 |   | _ Prescreen |   |   |
|---|---|---|---|---|---|---|---|
|   |   |   | _ ONLD/Check Services Credit Bureau |   |   |   |   |
|   |   |   | _ Marketing |   |   |   |   |
| X | Custom Models: |   | Experian |   | Posting: |   | Back-end Billing |
|   | 2076 Exemplary Retailer's |   | _ Trans Union | X | Normal |   | Price: $ |
|   | 1923 Net Worth |   | _ CFC | X | Back-end - post hard inquiry using PARTNER BANK member number |   | Billing Codes: |
|   | 1838 Retail Usage Predictor |   | _ Riskwise/BTE |   |   |   |   |
|   |   |   | _ Other: |   |   |   |   |

OTHER PROCESSING

_ Smartletter

_ Account Number Generation

_ Other Letter Processing

_ Address Variance

_ Address Standardization

_ Check Systems

_ Zip Code Tables

_ Other

_ OFAC Alert
   e-mail addresses: (minimum of 2 required)

Access Details

Communication Protocol:

X LU6.2
_ LU2
_ TCP/IP
_ Dial-Up/Async
_ Other:

Input Format:

X Fixed DIAL/IDNT
_ Variable DIAL/IDNT
_ Variable DIAL/Fixed IDNT
_ Custom:

MD Segment(s):

_ Transmitted by Customer
X Appended by Scoring Model
_ Not needed

AutoPilot:

X AutoPilot Used
_ Not used

If yes, CAM Name is: _____

TBD _____

Output Format:

X FFF/HMR Reformatted
_ Readable/Printable
X Custom - MM segment
_ Other

Third Party Processor or Software:

X No
_ Yes
    If Yes,

Vendor: _____
Software Name: _____
Version: _____

TABLE 2

Decision Matrix
SPECIAL CONDITIONS

| CONDITION | DECISION |
|---|---|
| Hit/No Hit Indicator = 2, A, B | Credit Limit = $250, set Custom No Hit Flag to "Y" otherwise "N" If Custom No Hit Flag is set to "Y" and Applicant's age < 40, then return Credit Limit = 00000 and Reason Code 1 = 090. Set Custom No Hit Flag to "Y" otherwise "N" Credit Limit = 00000 |
| Hit/No Hit Indicator = 3, 4, 5, 7, 8 | Clear Reason Codes 1-4 Set Reason code 1 = "97" otherwise "N" Set custom No Hit Flag to "Y" otherwise "N" Set Consumer Statement Flag = "Y" If age > 39 then process normally. If Custom No Hit Flag is set to "Y" and Applicant's age < 40, then return Credit Limit = 00000 and Reason Code 1 = 090. |
| Hit/No Hit Indicator = 6 Fraud Victim | Fraud Victim Indicator set in Header Credit Limit = 00000 Clear Reason Codes 1-4 Set Reason code 1 = "96" |
| AKA | Set verify flag to "Y" if approved |
| No Score: Pinnacle Reject Codes X7, P6, P1 | Credit Limit = 00000 Pinnacle Score = Pinnacle Reject Code Clear Reason Codes 1-4 Set Reason code 1 = "96" |
| No Score: Pinnacle Reject codes P2, P3, P4, P5 | Credit Limit = $250, Custom No Hit Flag = "Y" Pinnacle Score = Pinnacle Reject Code If Custom No Hit Flag = Y and applicant's age < 40 (using DOB from IDNT segment), then set Credit Limit = 0000 and Reason Code 1 = 090. |
| Safescan Warning and input SSN does not = 111111111 for A, B, I, M (1) | Results     Output Full Verify flag     "Y" (Approves only) Reason Codes 1-4     Clear (Approves only) Reason Code 1     96 (Approves only) |
| Safescan = C, D, E, F, G, H, J, K, P, U, Y, Z, 2, 3 (1) | Results     Output Full Verify flag     "Y" (Approves only) Reason Codes 1-4     Clear (Approves only) Reason Code 1     96 (Approves only) |

Scored Transactions

Step 1—Use the Pinnacle Score to determine the Credit Limit Calculation Number to use.

| Pinnacle Score | | Decision |
|---|---|---|
| Low | High | |
| XX | XX | Credit Limit = 00000 |
| XX | XX | Calculate Credit Limit using Calculation #3 |
| XX | XX | Calculate Credit Limit using Calculation #2 |
| XX | XX | Calculate Credit Limit using Calculation #1 |

Step 2—Use the Usage Predictor Score and Pinnacle Score to determine the Base Limit.

| Usage Predictor Score | Pinnacle Score | Base Limit |
|---|---|---|
| 000-500 | 620-699 | |
| 501-580 | 620-699 | |
| 581-779 | 620-699 | |
| 780-819 | 620-699 | |
| 820-859 | 620-699 | |
| 860-899 | 620-699 | |
| 900+ | 620-699 | |
| 000-500 | 700-1000 | |
| 501-580 | 700-1000 | |
| 581-779 | 700-1000 | |
| 780-819 | 700-1000 | |
| 820-859 | 700-1000 | |
| 860-899 | 700-1000 | |
| 900+ | 700-1000 | |

Step 3—Use the Credit Limit Calculation Number from Step 1 and the Net Worth score to determine the multiplier and minimum/maximum limits. Calculate the credit limit by multiplying the base limit (from Step 2) by the base multiplier. Round up to the nearest 100.

Credit Limit Calculation #1

| Net Worth Score | Multiplier | Calculation | Minimum Limit | Maximum Limit | Report Text |
|---|---|---|---|---|---|
| 0-150 | 50% | Base Limit * .5 | | | |
| 151-420 | 100% | Base Limit * 1 | | | |
| 421-760 | 200% | Base Limit * 2 | | | |
| 761-1190 | 300% | Base Limit * 3 | | | |
| 1191-9999 | 400% | Base Limit * 4 | | | |

Credit Limit Calculation #2

| Net Worth Score | Multiplier | Calculation | Minimum Limit | Maximum Limit | Report Text |
|---|---|---|---|---|---|
| 0-150 | 25% | Base Limit * .25 | | | |
| 151-420 | 50% | Base Limit * .5 | | | |
| 421-760 | 100% | Base Limit * 1 | | | |
| 761-1190 | 150% | Base Limit * 1.5 | | | |
| 1191-9999 | 200% | Base Limit * 2 | | | |

Credit Limit Calculation #3

| Net Worth Score | Multiplier | Calculation | Minimum Limit | Maximum Limit | Report Text |
|---|---|---|---|---|---|
| 0-150 | 25% | Base Limit * .25 | | | |
| 151-420 | 50% | Base Limit * .5 | | | |
| 421-9999 | 100% | Base Limit * 1 | | | |

Special Instructions

On Joint applicants, the exemplary retailer will send two IDNT segments with one DIAL segment. They will always use the Inquiry Type "I"; therefore we will have to look for multiple IDNT segments.

The M1 file is used in all cases. For joint inquiries, NextGen returns the better of the two decisions with the name/address information for that file only. The credit file information for the other applicant is not returned. If both decisions are "0", the M1 file for the primary applicant is returned.

*A pass will be any credit limit. The Hit/No Hit Designator will determine the amount of the limit ($250 or $0000). If a no hit is encountered.

*All Verify Flags should be set to "N" if not set to "Y". The credit limit should be calculated in all cases unless otherwise noted, even if a Full Verify Flag, Address Variance, etc. is present.

(1) Hit/No Hit Codes
1=Hit
2=No Hit
3=Manual File
4=Manual Consumer Narrative
5=Referred Code
6=Hit and Automated Consumer Narrative
7=Reserved
8=Reserved
9=Reserved
A=Consumer requested security freeze on credit file—Report Unavailable
B=Report Unavailable—access number provided does not match consumer's file
(2) T=ID Theft Victim—Information blocked due to police or DMV report.
V=Consumer is a Victim of Fraudulent Activity.

TABLE 3

Reporting Requirements

Daily Transaction Detail Report:

The daily comma delimited report will contain the following data items:
Transaction Date
Transaction Number (internal Processing Platform tracking number)
Customer Reference (Exemplary retailer unique identifier)
Last Name
First Name
SSN
PARTNER BANK Approval Flag (Y/N)
Exemplary Retailer Credit Limit (00000 if decline)
Pinnacle Score
Reason Code 1
Reason Code 2
Reason Code 3
Reason Code 4
Safescan Code
Bankruptcies (01 = failed, blank = passed)
Current Status (02 = failed, blank = passed)
Previous High Rates (03 = failed, blank = passed)
Customer's Own Tradelines (04 = failed, blank = passed)
Customer's Own Inquiries (05 = failed, blank = passed)
Regular Online Inquiries (06 = failed, blank = passed)
Minimum Trades to qualify (07 = failed, blank = passed)
Valid SSN (08 = failed, blank = passed)
Address (09 = failed, blank = passed)
Aggregate Revolving Balance (10 = failed, blank = passed)
Number of Bankcards (11 = failed, blank = passed)
Aggregate Unpaid Public Records (12 = failed, blank = passed)

Management Report:

| | | | |
|---|---|---|---|
| Format: | Custom | | |
| Naming Convention (8.3): | MONYYUD3.RPT | | |
| Delivery Method: | FTS | Directory: | ud30001 |
| Frequency: | Monthly | | |

CRA
Processing Platform Monthly Summary Report
[DATE] [TIME] to [DATE] [TIME]
Customer name: (UD3DPW) [EXEMPLARY RETAILER]
Application name: (BCVFNB) SYSTEM TO SYSTEM

| | |
|---|---|
| Total Transactions | 29571 |
| Minus validation/ inquiry errors | 0 (0.00% of total) |
| Minus processing errors | 16 (0.05% of total) |

-continued

CRA
Processing Platform Monthly Summary Report
[DATE] [TIME] to [DATE] [TIME]
Customer name: (UD3DPW) [EXEMPLARY RETAILER]
Application name: (BCVFNB) SYSTEM TO SYSTEM

| | | |
|---|---|---|
| Minus no-hits | 4450 | (15.05% of total) |
| Total hits | 25105 | (84.90% of total) |

SAFESCAN WARNINGS

| Total | A | B | C | D | E | F | G | H | I | J |
|---|---|---|---|---|---|---|---|---|---|---|
| 1823 | 962 | 0 | 203 | 0 | 5 | 4 | 8 | 15 | 118 | 43 |

SAFESCAN WARNINGS

| | K | M | N | P | U | Y | Z | 0 | 2 | 3 |
|---|---|---|---|---|---|---|---|---|---|---|
| | 6 | 417 | 0 | 3 | 0 | 1 | 34 | 0 | 2 | 2 |

PINNACLE SCORE DISTRIBUTION

| Total | 0-599 | 600-609 | 610-619 | 620-629 | 630-639 | 640-649 | 650-659 | 660-669 | 670-679 |
|---|---|---|---|---|---|---|---|---|---|
| 23324 | 210 | 1102 | 1936 | 3151 | 305 | 1598 | 703 | 4129 | 10190 |

| | 680-689 | 690-699 | 700-709 | 710-719 | 720-729 | 730-739 | 740-749 | 750-799 | 800+ |
|---|---|---|---|---|---|---|---|---|---|
| | 1200 | 1201 | 1555 | 101 | 110 | 105 | 203 | 115 | 500 |

PINNACLE REJECT CODE DISTRIBUTION

| Total | P1 | P2 | P3 | P4 | P5 | P6 | X7 |
|---|---|---|---|---|---|---|---|
| 1781 | 0 | 0 | 0 | 0 | 0 | 0 | 0 |

USAGE SCORE DISTRIBUTION

| Total | 0-500 | 501-580 | 581-779 | 780-819 | 820-859 | 860-899 | 900-99999 |
|---|---|---|---|---|---|---|---|
| 25105 | 21292 | 2079 | 1591 | 70 | 53 | 18 | 2 |

NET WORTH SCORE DISTRIBUTION

| Total | 0-150 | 151-420 | 421-760 | 761-1190 | 1191-99999 |
|---|---|---|---|---|---|
| 25105 | 5144 | 4616 | 3141 | 3450 | 8754 |

Files with:

| | |
|---|---|
| Accounts On Us Flag | 6039 |
| Custom No Hit Flag | 1778 |
| Consumer State. Flag | 59 |
| Inquiry On Us Flag | 2646 |
| Full Verify Flags | 914 |
| Address Variance Flag | 25104 |
| TOTAL FLAGS | 36540 |
| SafeScan Warnings | 1823 |
| PARTNER BANK Approvals | 1234 |

Offer Summary:

| — | 0-659 | 660-699 | 700-749 | 750-799 | 800+ | Total | |
|---|---|---|---|---|---|---|---|
| Credit Limit $250 | 1754 | 0 | 0 | 0 | 0 | 1754 | 8.41% |
| Credit Limit $300 | 1364 | 1112 | 0 | 0 | 0 | 2476 | 11.87% |
| Credit Limit $400 | 3 | 0 | 0 | 0 | 0 | 3 | 0.01% |
| Credit Limit $500 | 358 | 94 | 110 | 15 | 0 | 577 | 2.77% |
| Credit Limit $600 | 4 | 1 | 0 | 0 | 0 | 5 | 0.02% |
| Credit Limit $700 | 0 | 0 | 0 | 0 | 0 | 0 | 0.00% |
| Credit Limit $800 | 3 | 2 | 0 | 0 | 0 | 5 | 0.02% |
| Credit Limit $900 | 0 | 0 | 0 | 0 | 0 | 0 | 0.00% |
| Credit Limit $1000 | 293 | 671 | 862 | 385 | 9 | 2220 | 10.64% |
| Credit Limit $1100 | 0 | 0 | 0 | 0 | 0 | 0 | 0.00% |
| Credit Limit $1200 | 4 | 1 | 1 | 0 | 0 | 6 | 0.03% |
| Credit Limit $1300 | 0 | 0 | 0 | 0 | 0 | 0 | 0.00% |
| Credit Limit $1400 | 0 | 0 | 0 | 0 | 0 | 0 | 0.00% |
| Credit Limit $1500 | 1 | 0 | 0 | 0 | 0 | 1 | 0.00% |
| Credit Limit $1600 | 0 | 0 | 0 | 0 | 0 | 0 | 0.00% |
| Credit Limit $1700 | 0 | 0 | 0 | 0 | 0 | 0 | 0.00% |
| Credit Limit $1800 | 0 | 0 | 0 | 0 | 0 | 0 | 0.00% |
| Credit Limit $1900 | 0 | 0 | 0 | 0 | 0 | 0 | 0.00% |
| Credit Limit $2000 | 114 | 396 | 832 | 890 | 86 | 2318 | 11.11% |
| Credit Limit $2100 | 0 | 0 | 0 | 0 | 0 | 0 | 0.00% |

CRA
Processing Platform Monthly Summary Report
[DATE] [TIME] to [DATE] [TIME]
Customer name: (UD3DPW) [EXEMPLARY RETAILER]
Application name: (BCVFNB) SYSTEM TO SYSTEM

| | | | | | | | |
|---|---|---|---|---|---|---|---|
| Credit Limit $2200 | 0 | 0 | 0 | 0 | 0 | 0 | 0.00% |
| Credit Limit $2300 | 0 | 0 | 0 | 0 | 0 | 0 | 0.00% |
| Credit Limit $2400 | 0 | 0 | 1 | 0 | 0 | 1 | 0.00% |
| Credit Limit $2500 | 0 | 0 | 0 | 0 | 0 | 0 | 0.00% |
| Credit Limit $2600 | 0 | 0 | 0 | 0 | 0 | 0 | 0.00% |
| Credit Limit $2700 | 0 | 0 | 0 | 0 | 0 | 0 | 0.00% |
| Credit Limit $2800 | 0 | 0 | 0 | 0 | 0 | 0 | 0.00% |
| Credit Limit $2900 | 0 | 0 | 0 | 0 | 0 | 0 | 0.00% |
| Credit Limit $3000 | 75 | 326 | 956 | 1485 | 376 | 3218 | 15.43% |
| Credit Limit $3100 | 0 | 0 | 0 | 0 | 0 | 0 | 0.00% |
| Credit Limit $3200 | 0 | 0 | 0 | 0 | 0 | 0 | 0.00% |
| Credit Limit $3300 | 0 | 0 | 0 | 0 | 0 | 0 | 0.00% |
| Credit Limit $3400 | 0 | 0 | 0 | 0 | 0 | 0 | 0.00% |
| Credit Limit $3500 | 0 | 0 | 0 | 0 | 0 | 0 | 0.00% |
| Credit Limit $3600 | 0 | 0 | 0 | 0 | 0 | 0 | 0.00% |
| Credit Limit $3700 | 0 | 0 | 0 | 0 | 0 | 0 | 0.00% |
| Credit Limit $3800 | 0 | 0 | 0 | 0 | 0 | 0 | 0.00% |
| Credit Limit $3900 | 0 | 0 | 0 | 0 | 0 | 0 | 0.00% |
| Credit Limit $4000 | 0 | 0 | 1352 | 4511 | 2414 | 8277 | 39.68% |
| Credit Limit $4100 | 0 | 0 | 0 | 0 | 0 | 0 | 0.00% |
| Credit Limit $4200 | 0 | 0 | 0 | 0 | 0 | 0 | 0.00% |
| Credit Limit $4300 | 0 | 0 | 0 | 0 | 0 | 0 | 0.00% |
| Credit Limit $4400 | 0 | 0 | 0 | 0 | 0 | 0 | 0.00% |
| Credit Limit $4500 | 0 | 0 | 0 | 0 | 0 | 0 | 0.00% |
| Credit Limit $4600 | 0 | 0 | 0 | 0 | 0 | 0 | 0.00% |
| Credit Limit $4700 | 0 | 0 | 0 | 0 | 0 | 0 | 0.00% |
| Credit Limit $4800 | 0 | 0 | 0 | 0 | 0 | 0 | 0.00% |
| TOTALS: | 3973 | 2603 | 4114 | 7286 | 2885 | 20861 | |

The invention claimed is:

1. A method of providing an access device with associated multiple access device accounts, the method comprising:
    receiving, at a qualification process center, approval guidelines for approving access device accounts under qualification processes established by at least two access account providers;
    receiving, at the qualification process center, a single multipurpose access device application for approval of at least two access device accounts, each access device account being associated with a single one of the at least two access account providers;
    processing the completed multipurpose access device application concurrently by the at least two access account providers; and
    upon a positive result of the processing, providing a single multipurpose access device;
    wherein each of the at least two access device accounts is linked to the single multipurpose access device.

2. The method of claim 1, wherein the at least two access device accounts are linked.

3. The method of claim 1, wherein the single multipurpose access device comprises a card.

4. The method of claim 3, wherein the card is a credit card or a debit card.

5. The method of claim 1, further comprising:
    establishing a joint rewards program for the single multipurpose access device.

6. The method of claim 1, further comprising:
    providing profit sharing for the at least two access account providers.

7. The method of claim 1, further comprising:
    issuing separate statements for each of the at least two access device accounts.

8. The method of claim 1, wherein the processing is performed by one of the at least two access account providers.

9. A system for providing an access device with associated multiple access device accounts, the system comprising:
    means for receiving, at a qualification process center, approval guidelines for approving access device accounts under qualification processes established by at least two access account providers;
    means for receiving, at the qualification process center, a single multipurpose access device application for approval of at least two access device accounts, each access device account being associated with a single one of the at least two access account providers;
    means for processing the completed multipurpose access device application concurrently by the at least two access account providers; and
    means for providing a single multipurpose access device upon a positive result of the processing;
    wherein each of the at least two access device accounts is linked to the single multipurpose access device.

10. The system of claim 9, wherein the at least two access device accounts are linked.

11. The system of claim 9, wherein the single multipurpose access device comprises a card.

12. The system of claim 11, wherein the card is a credit card or a debit card.

13. The system of claim 9, further comprising:
    means for establishing a joint rewards program for the single multipurpose access device.

14. The system of claim 9, further comprising:
    means for providing profit sharing for the at least two access account providers.

15. The system of claim 9, further comprising:
    means for issuing a statement for each of the at least two access device accounts.

16. The system of claim 9, wherein the means for processing is provided by one of the at least two access device providers.

17. A computer program product comprising a computer usable medium having control logic stored thereon for causing a computer to interactively assist with providing an access device with associated multiple access device accounts, the control logic comprising:

first computer readable program code means for receiving, at a qualification process center, approval guidelines for approving access device accounts under qualification processes established by at least two access account providers;

second computer readable program code means for receiving, at the qualification process center, a single multipurpose access device application for approval of at least two access device accounts, each access device account being associated with a single one of the at least two access account providers;

third computer readable program code means for processing the completed multipurpose access device application concurrently by the at least two access account providers; and fourth computer readable program code means for providing a single multipurpose access device upon a positive result of the processing;

wherein each of the at least two access device accounts is linked to the single multipurpose access device.

18. A system for electronically facilitating issuing an access device with associated multiple access device accounts, the system comprising:

a qualification process center for receiving approval guidelines for approving access device accounts under qualification processes established by at least two access account providers, the qualification process center;

receiving a single multipurpose access device application for approval of at least two access device accounts, each access device account being associated with a single one of the at least two access account providers; and processing the completed multipurpose access device application concurrently by the at least two access account providers; and upon a positive result of the processing, providing a single multipurpose access device;

at least one repository for storing the single multipurpose access device application and the qualification processes established by at least two access account providers; and at least one processor for processing requests from a user for performing operations on the stored single multipurpose access device application and the qualification processes established by at least two access account providers;

wherein the stored single multipurpose access device application is compared against the qualification processes established by at least two access account providers; and wherein, upon a positive result of the comparison, each of the at least two access device accounts is linked to the single multipurpose access device.

* * * * *